(No Model.)
T. CUNNIFF.
FAN ATTACHMENT FOR ROCKING CHAIRS.
No. 562,586. Patented June 23, 1896.
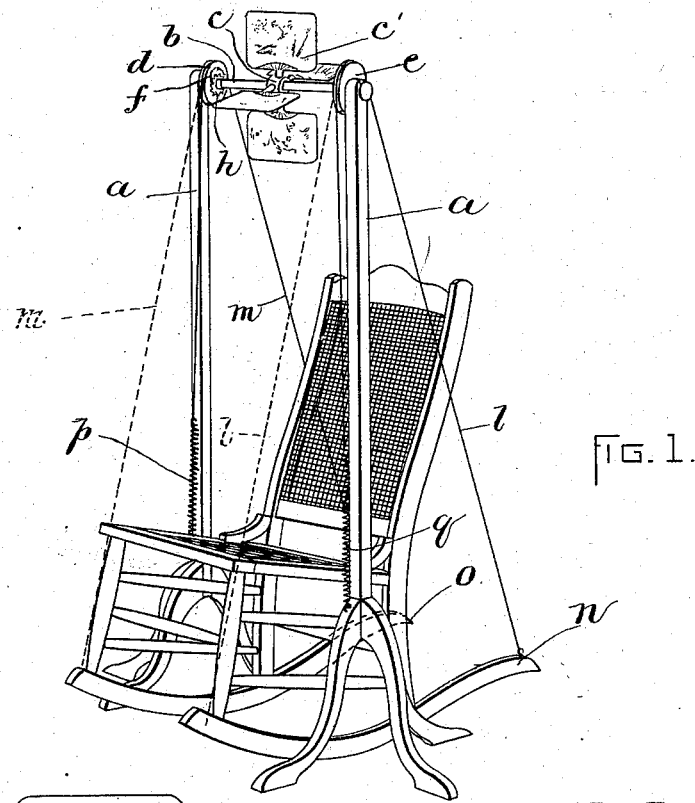
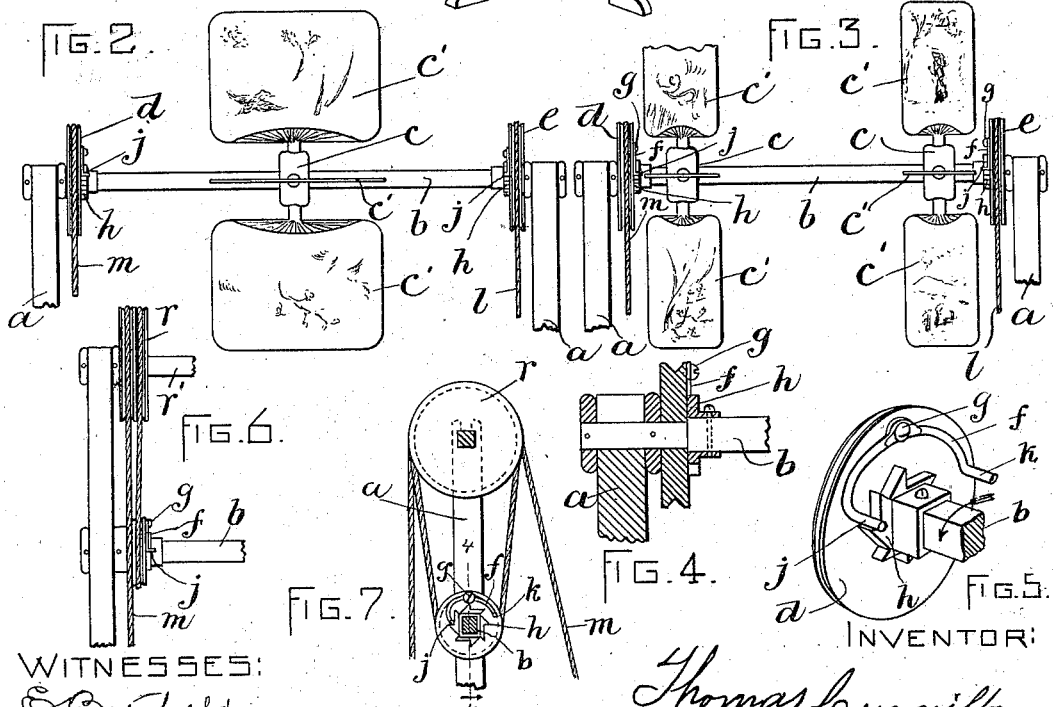
WITNESSES:
E. Batchelder
Rollin Abell
INVENTOR:
Thomas Cunniff

UNITED STATES PATENT OFFICE.

THOMAS CUNNIFF, OF BROOKLINE, MASSACHUSETTS.

FAN ATTACHMENT FOR ROCKING-CHAIRS.

SPECIFICATION forming part of Letters Patent No. 562,586, dated June 23, 1896.

Application filed April 23, 1895. Serial No. 546,936. (No model.)

*To all whom it may concern:*

Be it known that I, THOMAS CUNNIFF, of Brookline, in the county of Norfolk and State of Massachusetts, have invented certain new and useful Improvements in Fan Attachments for Rocking-Chairs, of which the following is a specification.

This invention relates to chair-operated fans; and it consists in the improvements which I will now describe and claim.

Of the accompanying drawings, forming a part of this specification, Figure 1 represents a perspective view of a rocking-chair provided with my improvements. Fig. 2 is a front view of the fan-shaft and its fan. Fig. 3 is a view similar to Fig. 2, showing two sets of fans. Figs. 4 and 5 represent detail views of the operating devices. Figs. 6 and 7 represent modified forms of operating devices, hereinafter described.

The same letters of reference indicate the same parts in all the views.

In carrying out my invention I provide two standards $a\ a$, provided at their upper ends with bearings in which is journaled a shaft $b$, preferably square in cross-section, and to which is attached a hub $c$, provided with fans $c'$. Said shaft is provided at its ends with pulleys $d\ e$, which are loosely mounted on the shaft. Each pulley is provided upon its inner face with a pawl $f$, pivoted at $g$ to the pulley, said pawls being adapted to engage with ratchets $h\ i$, secured to the shaft $b$, as shown in Fig. 5. The pawl is preferably bow-shaped and the ends bent outwardly at right angles to form dogs $j\ k$, adapted to engage with the ratchet, the arrangement being that a more effective engagement with the ratchet is assured; that is, should the dog $j$ fail to engage the ratchet, the dog $k$ will be engaged therewith, owing to the pawl being bow-shaped and pivoted to the pulley at $g$, as above stated.

$l\ m$ represent cords or bands, which are suitably secured to the rockers $n\ o$ and pass over the pulleys to springs $p\ q$, secured to the supporting-frame, the arrangement being such that sufficient tension is exerted upon the cords to rotate the pulleys, and therewith the fan, when the occupant rocks the chair backwardly. The cords $l\ m$ are connected solely to the upper surfaces of the rear ends of the rockers, so as to present no obstruction on the under side thereof to interfere with the freedom of movement of the chair.

When the pulley is rotated in the opposite direction from that required to rotate the shaft, the engagement of the dog $j$ with the pawl is so slight that it easily rides over the ratchet when the pulley is rotating backward, and quickly engages the teeth when the pulley is rotating forward. The momentum of the fans will cause them to rotate during the backward rotation of the pulley.

In Figs. 6 and 7 I have shown a different arrangement of driving means, in which the pulleys $d\ e$ are driven from larger pulleys $r$ on a shaft $r'$, the cord or band passing over said pulleys and around the pulleys on the shaft and back over the pulleys $r$ to the springs, the object being to rotate the fan-supporting shaft more rapidly.

I do not limit myself to the arrangement of the cords $l\ m$ shown in Fig. 1, in which one end of the latter is connected to the frame $a$, but may connect the cords to the opposite ends of the rockers, as shown in dotted lines in Fig. 1, which arrangement will effect a more rapid rotation of the fan-shaft.

I may employ two sets of fans, as shown in Fig. 3.

The standards $a\ a$ may be made extensible, so that the fan may be raised to accommodate a tall person.

I claim—

The combination with a rocking-chair, of the standards $a\ a$ independently supported and having a shaft $b$ mounted therein and provided with ratchets $h$, the fans $c'$, the pulleys $d\ e$ loosely mounted on the shaft and having the pawls $f$, the springs $p\ q$ secured to the standards, and the cords $l\ m$ connected with said pulleys and passing over the pulleys and connected with the upper surfaces of the ends of the chair-rockers, substantially as described.

In testimony whereof I have signed my name to this specification, in the presence of two subscribing witnesses, this 15th day of April, A. D. 1895.

THOMAS CUNNIFF.

Witnesses:
C. F. BROWN,
E. BATCHELDER.